Jan. 22, 1929.  F. N. CONNET  1,700,027
REVERSIBLE FLOW METER
Filed Aug. 13, 1924   3 Sheets-Sheet 3
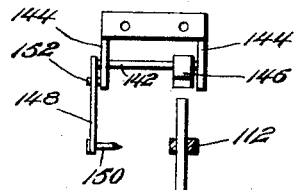
Fig. 4.
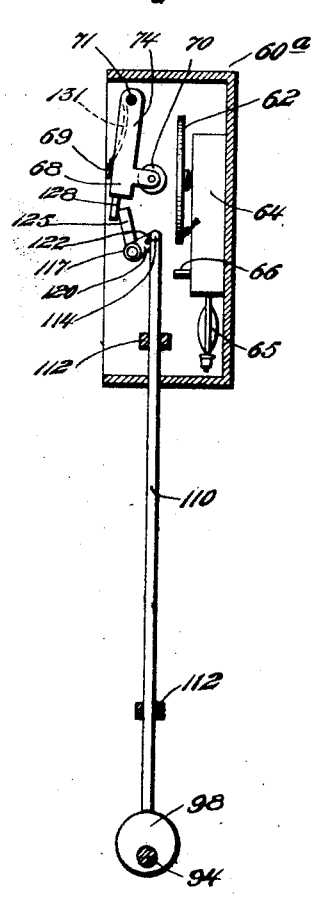
Fig. 3.
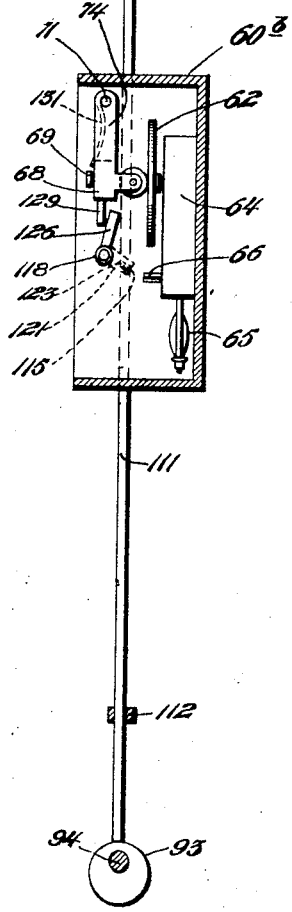
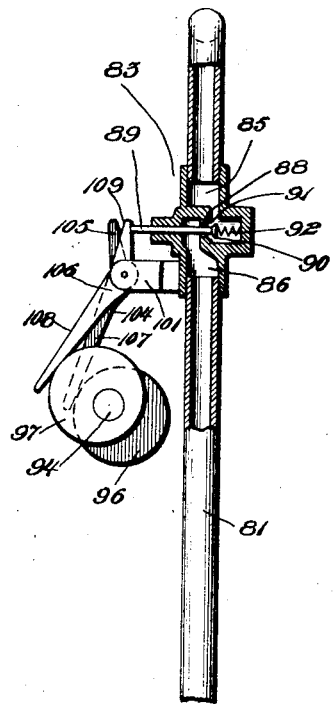
Fig. 5.
Inventor
Frederick N. Connet
By Thomas A. Jenckes Jr.
Attorney Patented Jan. 22, 1929.

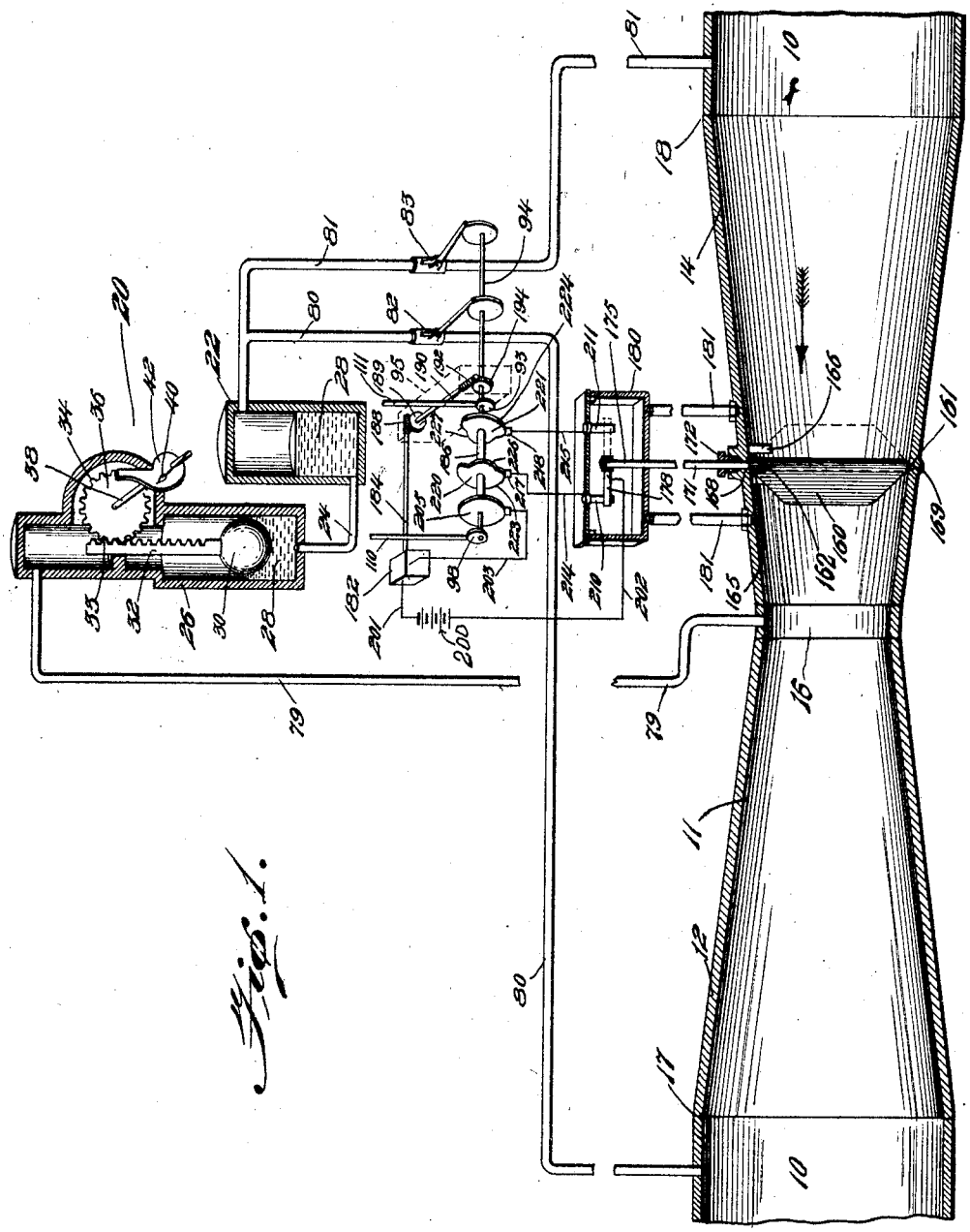

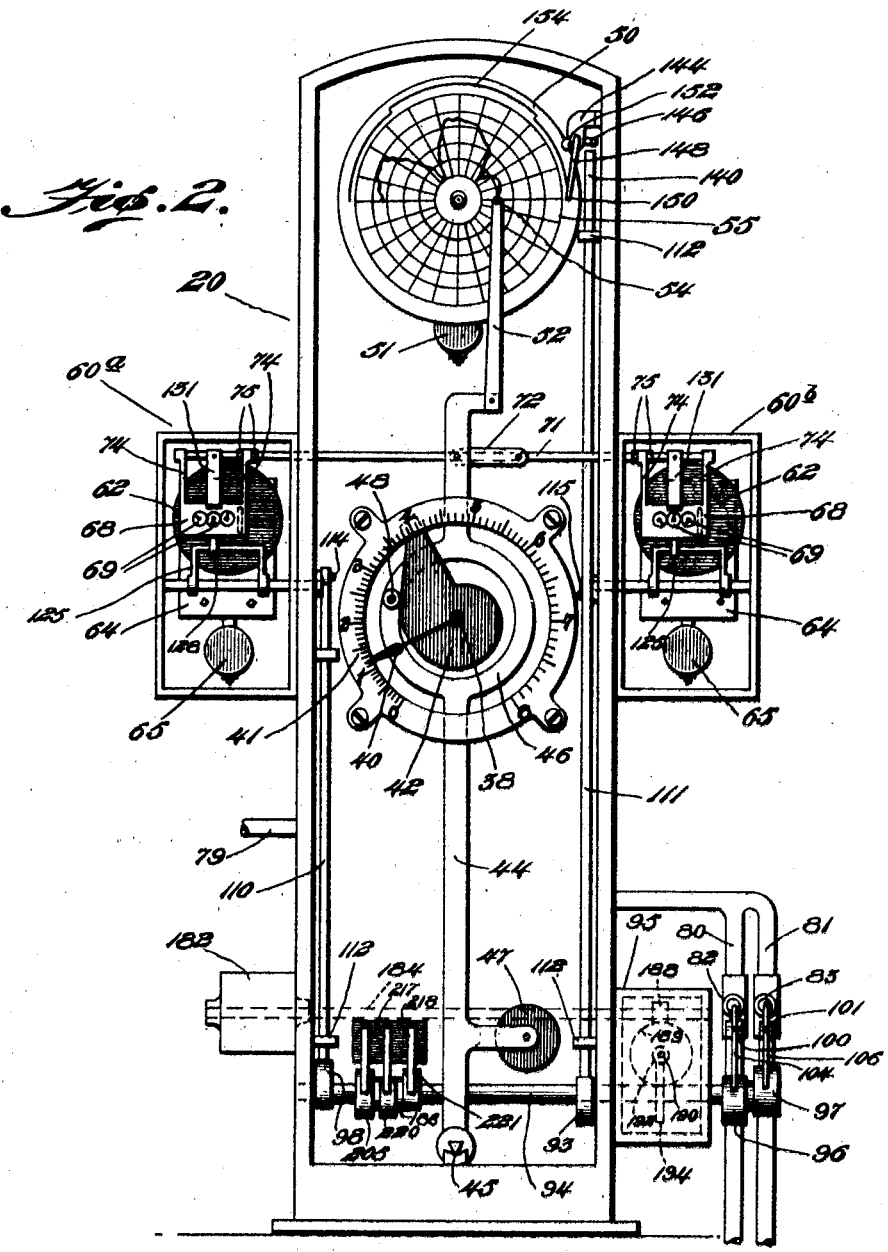

1,700,027

UNITED STATES PATENT OFFICE.

FREDERICK N. CONNET, OF PROVIDENCE, RHODE ISLAND, ASSIGNOR TO BUILDERS IRON FOUNDRY, OF PROVIDENCE, RHODE ISLAND, A CORPORATION OF RHODE ISLAND.

REVERSIBLE FLOW METER.

Application filed August 13, 1924. Serial No. 731,769.

My invention relates to reversible flow meters adapted to meter flow in a conduit in opposite directions.

In certain types of conduits, especially in water distribution in cities the demand on the filter plant varies considerably and equalizing reservoirs at various parts of the city are used to steady the demand on the filter plant and maintain more nearly uniform pressure throughout the system. The flow is into the reservoirs when the city demand is low and out of them when the demand is high, through the same conduit.

So far as I am aware no one has attempted to automatically meter the reverse flow and consequently meters attached to conduits of this type have been subjected to inaccuracy in their readings. So far as I am aware no one has to date conceived of the idea of providing a unitary apparatus which will automatically meter the flow in a reverse direction and thereby overcome this inaccuracy. I therefore claim broadly any type of combined unitary apparatus which will automatically meter the flow of a fluid in a conduit in opposite directions. The main object of my invention therefore is to provide, I believe, for the first time a reversible flow meter. In my commercial embodiment my invention comprises means connected to a conduit to produce pressure differentials varying in a known manner with the rate of flow in said conduit, means actuated thereby to alternately indicate the flow in opposite directions and means operable upon a reversal of flow in said conduit to cause said indicating means to indicate the flow in the changed direction of flow. As the specific embodiment of said first means I connect a Venturi meter tube to a conduit. As the converging and diverging cones of a Venturi meter tube may be made substantially equal, it is obvious that such a Venturi meter tube provides one pressure differential producing element to meter the flow in one direction and an additional differential producing element to produce a differential indicative of the rate of flow in the opposite direction and wherein the flow in one direction produces a substantially equally large differential as the flow in the opposite direction. This device is therefore admirably suited for this purpose.

To provide a suitable indicating means to indicate the rate of flow in opposite directions, I modify a standard Venturi meter indicator to be actuated by the pressure differentials produced by the pressure differential producing elements to indicate the flow in opposite directions. I connect the low pressure side of the indicator with the opposite low pressure side of the pressure differential producing element or where a Venturi meter tube is used to the throat of said tube. I connect the high pressure sides of the pressure differential producing elements to the high pressure side of said indicator. I provide two separate integrating mechanisms in said indicator, each to integrate the flow in the opposite direction. I provide mechanism actuated by a change in the direction of flow in said conduit which does three things, namely, 1, to operatively alternately connect the respective high side of the pressure differential producing elements to the high side of the indicator, in the embodiment shown by alternately opening and closing valves from the alternate inlets and outlets of the Venturi meter tube; 2, coincident with the functioning of said pressure connecting means, I connect the indicator with the integrating mechanism designed to integrate the flow in the then direction of flow, and 3, coincidently with the functioning of both said connecting mechanisms I denote in some manner in the mechanism of the integrator a change in the direction of flow. It is obvious that the combined functioning of these means causes the usual indicator to show record and integrate the amount, rate and direction of flow in opposite directions.

These and such other objects of my invention as may hereinafter appear will be best understood from a description of one embodiment thereof such as the embodiment shown in the accompanying drawings.

In the drawings, Fig. 1 is a diagrammatic skeleton view showing the principal parts of the preferred form of my invention.

Fig. 2 is a front elevation of my preferred modified form of Venturi meter indicator.

Fig. 3 is a detailed transverse sectional view looking towards the side of one integrating mechanism.

Fig. 4 is a detailed transverse sectional view looking towards the side of the opposite integrating mechanism, showing the means I employ for indicating the change in the direction of flow on the recording mechanism.

Fig. 5 is a side elevation partially shown in section of the valves in the pipes connecting the high pressure side of the indicator with the respective high pressure sides of the differential producing means.

In the drawings, wherein like characters of reference indicate like parts throughout, 10 generally indicates a conduit, through which fluid is adapted to flow in either direction. As explained, in the embodiment shown, I employ as the differential producing means the Venturi meter tube 11 having the usual portions 12 and 14 tapering to the usual constricted throat 16. Said Venturi meter tube is suitably connected to the conduit 10 at the points 17 and 18 respectively. As, in my preferred embodiment, the tapering sides 12 and 14 are substantially equal, it is obvious that said Venturi meter tube 11 may be used as a pressure differential producing means to produce a pressure differential indicative of the rate of flow in either direction. When the direction of flow is as indicated by the arrow in Fig. 1 it is obvious that the portion 18 will become the inlet and the portion 17 the outlet and on a reversal of flow the portion 17 will become the inlet and the portion 18 the outlet. This illustrates the peculiar adaptability of a Venturi meter tube to provide differential producing means wherein the differential produced varies in a known manner with the rate of flow and wherein the rate of flow in one direction produces a substantially equal differential as an equal flow in the opposite direction. It is obvious, however, that any equivalent pressure differential producing means such as an orifice, Pitot tube, etc. may be employed. As the Venturi meter tube, due to its peculiar construction acts first as an element to produce a pressure differential indicative of the rate of flow in one direction and on a reversal of flow a pressure differential producing element to produce a differential indicative of the rate of flow in the opposite direction, it is obvious that instead of the one element shown two separate Venturi meter tubes or two separate differential producing elements reversably connected may be employed to do the work that a single modified Venturi meter tube connected in this fashion will do.

20 generally indicates a standard Venturi meter indicator, the chief parts of which are diagrammatically illustrated in Fig. 1 and shown in detail in Figs. 2–5. The high pressure sides of the differential producing means are connected to the high pressure well 22 which is connected by the pipe 24 as usual to the low pressure well 26. The low pressure well 26 is in turn connected to the low pressure sides of the differential producing elements. A pressure responsive liquid 28 preferably mercury is therefore free to flow back and forth from the high pressure well 22 to the low pressure well 26 through the pipe 24 with changes in the pressure differentials. A float 30 is buoyantly supported by the mercury 28 in the low pressure well 26, and has the rack 32 projecting upwards therefrom having the teeth 33 adapted to enmesh the teeth 34 on the gear 36 mounted on a shaft 38 projecting transversely of the indicator 20. Said shaft 38 has the usual pointer 40 mounted thereon to indicate on the usual dial 41 the rate of flow and the usual cam 42 which actuates as usual the lever 44 suitably pivoted as at 45 on the base of the indicator. Said lever 44 has the usual yoke 46 having the pin and roller 48 projecting therefrom held in contact with the cam 42 by the weight 47 to impart the usual pivotal motion to said lever 44. The usual recording mechanism 50 is placed at the top of the indicator which is revolved as usual by clockwork, the pendulum 51 of which is shown. The lever 44 carries the usual upwardly extending arm 52 which carries the usual pen 54, to indicate on the recording chart 55 the rate of flow over periods of time.

The indicator as described is similar in construction to the standard indicator used. To adapt said indicator for use in my invention, in place of the usual single integrating mechanism I provide two integrating mechanisms $60^a$ and $60^b$ each to integrate the flow in opposite directions and each preferably mounted on opposite sides of the indicator 20. Said integrating mechanisms $60^a$ and $60^b$ are identical in construction with the usual integrating mechanism having the usual disks 62 revolved as usual by the usual clock work 64, said clock work mechanisms 64 each having the usual pendulums 65 and winding stems 66. The usual counter mechanisms 68 provided with the usual dials 69 are revolved as usual by the wheels 70 adapted to be moved outwards radially across the face of the disks 62, by the lever 44 to vary the rate of integration thereof in proportion to the rate of flow. Both counter mechanisms 68 are mounted on the horizontally movable rod 71, suitably mounted on the indicator 20 and connected to the lever 44 by means of the link 72. It is obvious that as the lever 44 moves with changes in the rate of flow, that both counter mechanisms 68 will be moved radially across the faces of their respective driving disks 62. Said counter mechanisms 68 are suitably pivoted on the horizontally movable rod 71 by means of the arms 74. The collars 75 abut said arms 74 to cause sidewise movement of the counter mechanisms 68 with said rod 71. It is obvious that I have provided two integrating mechanisms controlled in their rate of integration by the position of the usual lever 44. Said lever 44 is provided with the usual counter weight 47 to keep the roller 48 always in contact with the cam 42.

The means I employ to operatively connect the proper integrating mechanism 60 with the indicator 20 on changes in the direction of flow will be described later.

As explained, I connect the high pressure sides of the pressure differential producing means 11 to the high pressure side of the indicator 20. In the embodiment shown, I connect the portions 17 and 18 of the conduit 10 adjacent to the tapering sides of the Venturi meter tube 11 to the high pressure well 22 of the indicator 20 by means of pipes 80 and 81 which are provided with the valves 82 and 83 respectively, adapted to alternately open and close the same. While any type of suitable valve may be employed, in the embodiment shown I provide a valve having two chambers 85 and 86 connected by an orifice 88. A stem 89 having the valve head 90 is adapted to be reciprocated in and out of said valve seat 91 in the orifice 88 between the two chambers 85 and 86 thereof. Said stem is adapted to be pressed inwards to unseat the valve head 90 and is provided with the spring 92 to seat the valve head 90 in the valve seat 91 on withdrawal of inward pressure on the stem 89. The valve 82 is identical in construction with the valve 83. A pipe 79 connects the low pressure sides of the pressure differential producing means, in the embodiment shown the throat 16 of the Venturi meter tube, with the low pressure well 26 of the indicator.

As explained, I provide means actuated by a reversal of flow in said conduit to conjointly operatively connect the high pressure side of the pressure differential producing means with the high pressure side of the indicator, to conjointly connect the proper integrating mechanism with the indicator and to conjointly denote a change in the direction of flow in the recording mechanism of said indicator. I will now describe the embodiment of said means I employ in detail, though any type of movable means may be employed for this purpose. I preferably mount the shaft 94 transversely of the lower portion of the indicator 20 as shown in Fig. 2, said shaft projecting through one side of the indicator 20 through the gear box 95 and adjacent to the valves 82 and 83. I mount the eccentric cams 98 and 93 on said shaft 94 preferably at opposite sides of said indicator 20. Said eccentric cams 98 and 93 are preferably identical in size and construction and are mounted so as to have their longest radii at diametrically opposite points of said shaft 94. To actuate the valves 82 and 83 respectively the eccentric cams 96 and 97 are similarly mounted on shaft 94. These also are of substantially equal size with each other. It is obvious that on each alternate half revolution of the shaft 94 the eccentric cams 98 and 97 will have their longest radii uppermost and the cams 93 and 96 their longest radii downmost. I attach the brackets 100 and 101 on the pipes 80 and 81 respectively adjacent to said valves 82 and 83 respectively. I pivotally mount on said brackets 100 and 101 the levers 104 and 106 respectively. The long arms 107 and 108 of said levers 104 and 106 are adapted to contact the upper portions of said cams 96 and 97, and the short arms 105 and 109 of said levers are adapted to contact the respective valve stems 89 in said valves 82 and 83. It is obvious that with this construction on each alternate half revolution of the shaft 94 the valves 82 and 83 will be alternately opened and shut.

As explained the counter mechanisms 68 are pivoted by means of arms 74 on the cross rods 71. I provide means alternately with changes in the direction of flow to operatively connect and disconnect the integrating mechanisms 60ª and 60ᵇ with the indicator 20. In my preferred embodiment said means comprise the rods 110 and 111 mounted vertically in each side of the indicator 20 and held in a vertical position by the brackets 112. The lower ends of said rods 110 and 111 are adapted to contact the cams 98 and 93 oppositely mounted on the shaft 94. Pins 114 and 115 project sidewise from said rods 110 and 111. The levers 117 and 118 are suitably pivoted within the respective integrating mechanisms 60ª and 60ᵇ. The short arms 120 and 121 of said levers are provided with slots 122 and 123 to receive said pins 114 and 115 projecting from the sides of said vertical rods 110 and 111. The long arms 125 and 126 of said levers are adapted to contact arms 128 and 129 depending from the counter mechanisms 68. From this construction it is obvious that as the cams 98 and 93 alternately force the rods 110 and 111 up and down, that said levers 117 and 118 will be pivoted thereby causing the long arms 125 and 126 to alternately thrust forwards thereby alternately lifting the wheels 70 of the pivoted counter mechanisms 68 away from contact with the disks 62 actuated by the clock work 64 in the integrating mechanisms 60ª and 60ᵇ. On alternate half revolutions of the shaft 94 and consequent lowering of the vertical rod 110 or 111 and consequent withdrawal of the long arm 125, or 126 of the pivoted levers 117 or 118 away from the depending arms 128 or 129 of the pivoted counter mechanisms 68 the spring means 131 will alternately operate to place the wheels 70 of the pivoted counter mechanisms 68 again into operative contact with the disks 62 revolved by the clock work 64. It is obvious that the above provides means to operatively alternately connect the respective integrating mechanisms 60ª and 60ᵇ with the indicator 20.

As explained, I provide means conjointly with the functioning of the operative connecting of the relative high pressure sides of the pressure differential producing means with the high pressure side of the indicator 20 and conjointly with the operative connecting of the integrating mechanisms 60ª and 60ᵇ respectively to the indicator 20, to denote a change in the direction in the rate of flow on the recording mechanism 50 of the indicator 20. To accomplish this, in my preferred embodiment, I continue the vertical rod 111 upwards as at 140 to a point adjacent the recording mechanism 50. A shaft 142 is suitably mounted in bracket arms 144 projecting from the side of the indicator 20 transversely of said indicator. Between the projecting arms 144, I key the arm 146 to said shaft. On the front end of said pivoted shaft 142, I key the depending arm 148. I mount on the lower extremity of said depending arm 148 the inwardly extending writing means 150 adapted to bear against the revolving recording chart 55. A stop 152 is provided for said depending arm 148, on the side of the front bracket 144. From the above construction, it is obvious that when the vertical rod 111 is forced up by the eccentric cam 93 that the upper end 140 thereof will contact the arm 146 keyed to the shaft 142 to cause pivotal movement of said shaft 142 to swing said depending arm 148 radially outwards and cause a change of position of said means 150 on the indicating chart 55 as shown at 154. On consequent lowering of said vertical rod 111 by change in position of the cam 93, the weighted arm 146 will swing by gravity downwards, causing the means 150 to move radially inwards upon the revolving chart 55. The stop 152 is provided to limit the inward pivotal movement of said depending arm 148.

As explained, I provide means operable upon a reversal of flow in said conduit to revolve said shaft 94 a half revolution to cause a functioning of the means to accomplish the results mentioned in the three preceding paragraphs. Though I have shown an oscillatable vane, an electric circuit and a motor to revolve the shaft 94, it is obvious that any suitable means may be employed to accomplish the results described. In my preferred embodiment, I provide the oscillatable vane 160 as the means in the conduit operable upon the reversal of flow to cause the functioning of said other means. Said vane 160 is similar in shape to the steering blade of a ship. It has a trunnion 161 in the lower end and a socket 162 in the upper end thereof. Stops 165 and 166 are preferably provided in said conduit to limit the oscillatable motion of said vane 160 on each half revolution thereof. Said stops 165 and 166, are spaced to permit a revolution of about 170° of said vane 160, so that said vane 160 may present an inclined surface so that the fluid may exert a positive turning movement in all positions thereof. A hole 168 is provided in said conduit above the desired position of said vane 160 and a socket 169 is provided in the conduit for the depending trunnion 161 of said vane underneath said hole 168. Though I have shown said means or vane 160 mounted in the tapering portion of the Venturi meter tube 11, it is obvious that it may be mounted on any suitable part of the conduit 10. With the specific construction of the vane shown, it is merely necessary to insert the trunnion 161 of the vane 160 into the socket 169 in the lower portion of said conduit 10 and place the socket 162 opposite the hole 168 and to insert the lower end of the shaft 171 into the socket 162 in the vane 160 thereby vertically mounting said vane 160 in said conduit 10. A stuffing box 172 may be provided to prevent leakage of fluid around said movable shaft 171. The upper end 175 of said shaft 171 is preferably provided with the switch blade 178 which as is apparent, turns the same as the vane 160 which may swing only approximately a half revolution. Said blade 178 is preferably mounted in the contact box 180 suitably secured to the top of the conduit 10 in the embodiment shown by means of the supporting posts 181.

A motor 182 is provided having a shaft 184 extending therefrom and into the gear box 95 mounted on the side of said indicator 20. Said shaft 184 has a worm 188 adapted to enmesh the work gear 189 on the shaft 190 which extends transversely of said gear box 95. Said shaft 190 has the worm 192 keyed thereto at the front end thereof to revolve the worm gear 194 mounted on the horizontal shaft 94. It is thus obvious that said motor 182 will operate through the medium of the gearing described to revolve the conducting sleeve-shaft 186 which is insulatedly keyed to the shaft 94 contained therein.

To actuate said motor, I supply the source of electricity 200, the battery as shown, one terminal 201 of which is connected to the motor 182 and the other terminal 202 to the oscillatable switch blade 178. A wire 203 connects the motor 182 with a cam 205 mounted on said shaft 186. I mount the contact posts 210 and 211 on diametrically opposite sides of said shaft 171 within said contact box 180. Said posts are therefore adapted to be contacted by said oscillatable switch blade on each half revolution thereof to form electric contacts therewith. The wires 214 and 215 respectively connect said contacts 210 and 211 respectively with contacts 217 and 218 at points adjacent to said revolving shaft 186. On said shaft 186 at points adjacent to said contacts 217 and 218, I mount the semi-circular cams 220 and 221. Said cams 220 and 221 each have near semi-circles 223 and 224 of equal radii and oppositely disposed near semi-circles 226 and 227 of equal smaller radii.

Said cams are mounted on said shaft 186 with the near semi-circles of larger radii 223 and 224 disposed at diametrically opposite sides thereof.

The operation of this electric circuit is obvious from the above description. On a change of direction of flow in said conduit said vane 160 will be revolved a half revolution. This will cause said switch blade 178 to alternately contact the posts 210 and 211 on each near half revolution thereof. On contact of this blade 178 with either post 210 or 211, it is obvious that the contacts 217 and 218 will be in contact with the semi-circles 223 and 224 of larger radii of the semi-circular cams 220 and 221 alternately respectively and that current will flow from the motor 182 through the sleeve-shaft 186 and connected respective cam 220 or 221 to complete a circuit with said blade 178 as explained, to cause the motor 182 by means of the gearing aforesaid described to revolve said shaft 94 so long as the contact points 217 or 218 remain in contact with the large portions 223 or 224 of the semi-circular cams 220 and 221. It is obvious, however, that when the shaft 94 has completed a one-half revolution, that the semi-circles 226 and 227 of smaller radii will come adjacent to the contacts 217 or 218 and that said described circuit will be broken causing the motor 182 to stop revolution of the shaft 94 at the end of a one-half revolution thereof and the contact points 217 and 218 will then contact alternately with the semi-circles 223 and 224 of larger radius on the oppositely disposed cam 220 or 221. A circuit will not be completed to start a revolution of the shaft 94, however, until the vane 160 has oscillated in the opposite direction nearly a complete one-half revolution, causing the switch-blade 178 to contact the opposite respective post 210 or 211 to complete a circuit to again cause the motor 182 by means of the gearing to revolve the shaft 94 another one-half revolution when the circuit will be once more broken as aforedescribed.

It is obvious that said vane 160 may flutter any amount up to one-half revolution without causing the blade 178 to contact the posts 210 and 211 to complete an electric circuit.

The operation of my invention is obvious from the above description. Assuming that the fluid is flowing through the conduit 10 in the direction of the arrow as shown in Fig. 1, the entire mechanism will be in the position shown in the drawings, the valve 83 will then be open connecting the then inlet 18 of the Venturi tube with the high pressure side 22 of the indicator 20. The throat 16 will be connected with the low pressure side 26 as usual. The integrating mechanism 60$^b$ will be connected to the indicator 20 and the writing means 150 will swing to its innermost radial position on the chart 55 thus showing the direction of flow. On a complete reversal of flow, the vane 160 will swing causing the switch blade 178 to contact the post 211 thereby completing an electric circuit to revolve the shaft 94 and sleeve-shaft 186 one-half revolution, as explained, until the circuit is broken by the portion 227 of smaller radius of the cam 221 coming opposite the contact point 218. This half revolution of the shaft 94 will cause the lowering of the rod 110 thereby operatively connecting the integrating mechanism 60$^a$ with its disk 62 and raising of the rod 111 operatively disconnecting the integrating mechanism 60$^b$ with its disk 62, and causing the writing means 150 to swing to its outer radial position on the chart 55, thus denoting a change in the direction of flow, and causing the closing of the valve 83 and the opening of the valve 82. There will be no further electric circuit completed until on another reversal of flow in the conduit 10, the vane 160 is again swung back to the opposite position when said circuit will again be completed. It is obvious that this cycle will be completed indefinitely with changes in the direction of flow, the mechanism 60$^a$ integrating the flow in one direction, the mechanism 60$^b$ integrating the flow in the opposite direction, the chart 55 recording the amount of flow and the line 154 showing the direction of flow and the pointer 40 indicating the rate of flow as usual.

It is obvious that in place of one indicator with two separate integrating mechanisms to integrate the flow in opposite directions that two complete integrators may be used either attached to a combined pressure differential producing means such as a Venturi meter shown or to two individual pressure producing means.

Though I have shown as the preferred embodiment of the pressure differential producing means a Venturi meter tube, having the throat continuously attached to the low pressure side of the indicator and which consequently produces a differential of the same sign regardless of the direction of flow in the conduit, thus permitting the use of a minimum of valves and a minimum amount of mercury or other pressure responsive fluid, it is obvious that pressure differential producing elements which produce differentials of opposite sign with changes in the rate of flow, such as a symmetrical fixed Pitot tube or orifice, may be employed with slight pressure connection modifications without departing from my invention. Where the text permits I employ the word "meter" to signify an instrument which will either indicate or record the rate of flow or register the quantity of flow or all severally or entirely combined and the word "meter" to signify the functioning of said instrument in any of said manners. I employ the word "show" to designate any suitable means for designating, signifying or recording the direction of flow, and I employ the word "denote" for the same purpose to give an indication of changes in the direction of flow.

As in my preferred embodiment I have shown a Venturi meter tube in which the converging and diverging portions are substantially equal to produce a substantially equally large differential by a flow in one direction as by an equal flow in an opposite direction I employ the word "symmetrical" to indicate a Venturi meter tube of this type.

It is understood that my invention is not limited to the specific embodiment shown and that various deviations may be made therefrom without departing from the spirit and scope of the appended claims.

What I claim is:

1. A reversible flow meter, comprising, in combination, means connected to a conduit to produce pressure differentials varying in a known manner with the rate of flow in said conduit, means connected thereto and actuated by said differentials to meter alternately the flow in opposite directions and means connected to said metering means and having a portion thereof automatically actuated by a reversal of flow in said conduit to cause said metering means to meter the flow in the changed direction of flow.

2. A reversible flow meter, comprising, in combination, means connected to a conduit to produce pressure differentials varying in a known manner with the rate of flow in said conduit, means connected thereto and actuated by said differentials to meter alternately the flow in opposite directions, means in said metering means to show the direction of flow, and means connected to said metering means and having a portion thereof automatically actuated by a reversal of flow in said conduit to cause said metering means to meter the flow in the changed direction of flow and said flow direction showing means to show the direction of flow.

3. A reversible flow meter, comprising, in combination, means connected to a conduit to produce pressure differentials indicative of the rate of flow in opposite directions, metering means connected thereto and actuated by said differentials to meter the flow and having alternately operable integrating mechanisms and means whereby said differentials may control their rate of integration, and means connected to said metering means having a portion thereof automatically actuated by the reversal of flow in said conduit to cause the proper differential to actuate its proper integrating mechanism.

4. A reversible flow meter, comprising, in combination, pressure differential producing means in a conduit wherein the differentials produced vary in a known manner with the rate of flow and wherein the flow in one direction produces a substantially equally large differential as an equal flow in the opposite direction, pressure differential measuring means connected thereto and actuated by said differentials and having high and low pressure sides and means to meter the flow in either direction, means to operatively connect the then high and low pressure sides of the differential producing means with the proper sides of the differential measuring means to cause said measuring means to meter the flow in the proper direction and means connected to said operatively connecting means and having a portion thereof automatically actuated by a reversal of flow in said conduit to actuate said operatively connecting means on reversal of flow in said conduit.

5. A reversible flow meter, comprising, in combination, pressure differential producing means in a conduit wherein the differentials produced vary in a known manner with the rate of flow and wherein the flow in one direction produces a substantially equally large differential as an equal flow in the opposite direction, pressure differential measuring means connected thereto and having high and low pressure sides, means mounted on said measuring means to meter the flow in either direction and means to show the direction of flow, means to operatively connect the then high and low pressure sides of the differential producing means with the proper sides of the differential measuring means to cause said metering means to meter the flow in the proper direction and said flow direction showing means to denote a change in the direction of flow, and means connected to said operatively connecting means and having a portion thereof automatically actuated by a reversal of flow in said conduit to actuate said operatively connecting means coincidentally with changes in the direction of flow.

6. A reversible flow meter, comprising, in combination, pressure differential producing means in a conduit wherein the differentials produced vary in a known manner with the rate of flow and wherein the flow in one direction produces a substantially equally large differential as an equal flow in the opposite direction, pressure differential measuring means having means mounted thereon to meter the flow in either direction, means connecting the low pressure side of the pressure differential producing means with the low pressure side of the pressure differential measuring means, means connecting the high pressure sides of the pressure differential producing means with the high pressure side of the differential measuring means and means connected to said connecting means having a portion thereof automatically actuated by a reversal of flow in said conduit to operatively connect the then high pressure side of the differential producing means with the high pressure side of the pressure differential measuring means to cause said measuring means to meter the flow in the proper direction.

7. A reversible flow meter, comprising, in combination, pressure differential producing means in a conduit wherein the differentials produced vary in a known manner with the rate of flow and wherein the flow in one direction produces a substantially equally large differential as an equal flow in the opposite direction, pressure differential measuring means having high and low pressure sides, means connecting said high and low pressure sides of said measuring means with said pressure differential producing means, movable means in said measuring means and actuated by said differentials to indicate and record the rate of flow, mechanisms in said measuring means to integrate the flow in either direction connected to and controlled in their rate of integration by said movable means, and means in said measuring means to show the direction of flow, means to operatively connect the then high pressure side of the differential producing means with the high pressure side of the pressure differential measuring means to cause said measuring means to meter the flow in the proper direction, means to connect the differential measuring means to its proper integrating mechanism and means to actuate said flow direction showing means to denote changes in the direction of flow and means connected to said last three mentioned means, and having a portion thereof automatically actuated by a reversal of flow in said conduit to simultaneously actuate said last three mentioned means.

8. A reversible flow meter, comprising, in combination, pressure differential producing means in a conduit wherein the differentials produced vary in a known manner with the rate of flow and wherein the flow in one direction produces a substantially equally large differential as an equal flow in the opposite direction, pressure differential measuring means having high and low pressure sides, means connecting the high and low pressure sides of said measuring means with the said pressure differential producing means, movable means in said measuring means actuated by said differentials to record the rate of flow, mechanisms in said measuring means to integrate the flow in either direction connected to and controlled in their rate of integration by said movable means and means in said measuring means to show the direction of flow, means to operatively connect the then high pressure side of the differential producing means with the high pressure side of the pressure differential measuring means to cause said measuring means to meter the flow in the proper direction, means to connect the differential measuring means to its proper integrating mechanism and means to actuate said flow direction showing means to denote changes in the direction of flow, means including a motor to simultaneously actuate said last three mentioned means, means connected to said last three mentioned means and having a portion thereof automatically actuated by a reversal of flow in said conduit to start said motor and means effective on operative connection of said pressure differential producing means and pressure differential measuring means in a reverse direction to shut off said motor.

9. A reversible flow meter, comprising, in combination, pressure differential producing means in a conduit wherein the differentials produced vary in a known manner with the rate of flow and wherein the flow in one direction produces a substantially equally large differential as an equal flow in the opposite direction, pressure differential measuring means having high and low pressure sides, means connecting the high and low pressure sides of said measuring means with said pressure differential producing means, movable means in said measuring means and actuated by said differentials to record the rate of flow, mechanisms in said measuring means to integrate the rate of flow in either direction connected to and controlled in their rate of integration by said movable means, means in said measuring means to show the direction of flow, a rotatable member, means controlled by said rotatable member to operatively connect the then high pressure side of the differential producing means with the high pressure side of the pressure differential measuring means to cause said measuring means to meter the flow in the proper direction, means controlled by said rotatable member to connect the differential measuring means to the proper integrating mechanism and means controlled by said rotatable member to actuate said flow direction showing means to denote changes in the direction of flow upon a half revolution of said rotatable member, a motor to rotate said member, means connected to said motor and having a portion thereof actuated by a reversal of flow in said conduit to start said motor and means effective on a half revolution of said rotatable member to stop said motor.

10. A reversible flow meter, comprising, in combination, a symmetrical Venturi meter tube connected to a conduit, a Venturi meter connected thereto and actuated by the differentials produced thereby and having means to alternately meter the flow in opposite directions and means connected to said meter and having a portion thereof automatically actuated by a reversal of flow in said conduit to cause said meter to meter the flow in the changed direction of flow.

11. A reversible flow meter, comprising, in combination, a symmetrical Venturi meter tube located in a conduit, a Venturi meter connected thereto and actuated by the differentials produced thereby and having means to alternately meter the flow in opposite directions and means to show the direction of flow and means connected to said meter and having a portion thereof automatically actuated by a reversal of flow in said conduit to cause said meter to meter the flow in the changed direction of flow and to show the direction of flow.

12. A reversible flow meter, comprising, in combination, a symmetrical Venturi meter tube connected to a conduit, a Venturi meter connected thereto and actuated by the differentials produced thereby and having alternately operable integrating mechanisms and means whereby the differential produced by said Venturi meter tube may control their rate of integration and means connected to said meter and having a portion thereof automatically actuated by a reversal of flow in said conduit to cause the proper differential to actuate its proper integrating mechanism.

13. A reversible flow meter, comprising, in combination, a symmetrical Venturi meter tube located in a conduit to produce pressure differentials indicative of the rate of flow in opposite directions, a Venturi meter connected thereto and actuted by said differentials and having means to meter the flow in either direction, a pipe connecting the throat of said Venturi meter tube with the low pressure side of said meter, pipes connecting each end of said Venturi meter tube with the high pressure side of said meter, a valve in each of said high pressure pipes and means connected to said valve and having a portion thereof automatically actuated by a reversal of flow in said conduit to open the valve in one pipe and close the valve in the other pipe to connect the up-stream end of the Venturi meter tube to the high pressure side of the meter to cause said meter to meter the flow in the proper direction.

14. A reversible flow meter, comprising, in combination, a symmetrical Venturi meter tube located in a conduit to produce pressure differentials indicative of the rate of of flow in opposite directions, a Venturi meter connected thereto and actuated by said differentials and having mounted thereon means to indicate the rate of flow controlled in its position by said differentials, a lever to record the rate of flow, means actuated by said indicating means to control the position of said lever, mechanisms to integrate the flow in either direction connected to said lever so that the rate of integration thereof may be controlled by the position of said lever and means to show the direction of flow, a pipe connecting the throat of said Venturi meter tube with the low, pressure side of said meter, pipes connecting each end of said Venturi meter tube with the high pressure side of said meter, a valve in each of said high pressure pipes, means connected to said valve to alternately actuate said valves to operatively connect the then up-stream end of said meter tube with the high pressure side of said meter, means to connect the meter to its proper integrating mechanism and means to cause said meter to denote changes in the direction of flow and means connected to said last three mentioned means and having a portion thereof automatically actuated by a reversal of flow in said conduit to actuate said last three mentioned means on a reversal of flow in said conduit.

15. A reversible flow meter, comprising, in combination, a symmetrical Venturi meter tube located in a conduit to produce pressure differentials indicative of the rate of flow in opposite directions, a Venturi meter connected thereto and actuated by said differentials and having means mounted thereon to indicate the rate of flow controlled in its position by said differentials, a recording lever pivoted therein, means actuated by said indicating means to control the position of said lever, mechanisms to integrate the rate of flow in either direction connected to said lever so that the rate of integration thereof may be controlled by the position of said lever, a pipe connecting the throat of said Venturi meter tube with the low pressure side of said meter, pipes connecting the ends of said Venturi meter tube with the high pressure side of said meter, a valve in each of said high pressure pipes, a rotatable shaft having sets of cams mounted thereon, means controlled by one of said sets of cams to open the valve in one pipe and to close the valve in the other pipe leading from the ends of said meter tube to reverse the connections, means controlled by another of said sets of cams to alternately operatively connect the meter with the proper integrating mechanism, means controlled by one of said cams to alternately record a change in the direction of flow, a motor to revolve said shaft, means connected to said motor and having a portion thereof actuated by a reversal of flow in said conduit to start said motor and means effective on operative reversal of connection of said Venturi meter tube and Venturi meter to stop said motor.

16. A reversible flow meter, comprising, in combination, a symmetrical Venturi meter tube located in a conduit to produce pressure differentials indicative of the rate of flow in opposite directions, a Venturi meter connected thereto and actuated by said differentials and having mounted thereon means to indicate the flow controlled by said differentials, a recording lever pivoted therein, means actuated by said indicating means to control the position of said lever and mechanisms to integrate the rate of flow in either direction connected to said lever so that the rate of integration thereof may be controlled by the position of said lever, a pipe connecting the throat of said Venturi meter tube with the low pressure side of said meter, pipes connecting each end of said Venturi meter tube with the high pressure side of said meter, a valve in each of said high pressure pipes, a rotatable shaft having sets of cams mounted thereon, means controlled by one of said sets of cams to open the valve in one pipe and close the valve in the other pipe leading from the ends of said meter tube to reverse the connections, means controlled by another of said sets of cams to alternately operatively connect the meter with the proper integrating mechanism, means controlled by one of said cams to alternately record a change in the direction of flow, a motor to actuate said shaft, a vane in said conduit oscillatable with change of direction of flow therein, means actuated by said vane to cause said motor to turn said cam shaft a half revolution on each reversal of flow, and means effective on operative connection of said Venturi meter to said Venturi meter tube in a reverse direction to shut off said motor.

17. A reversible flow meter, comprising, in combination, a symmetrical Venturi meter tube connected to a conduit, a Venturi meter connected thereto and actuated by the differentials produced thereby and having mounted thereon means to indicate the flow controlled by said differentials, a recording lever pivoted therein, means actuated by said indicating means to control the position of said lever, mechanisms to integrate the flow in either direction connected to said lever so that the rate of integration thereof may be controlled by the position of said lever, a pipe connecting the throat of said Venturi meter tube with the low pressure side of said meter, pipes connecting each end of said Venturi meter tube with the high pressure side of said meter, a valve in each high pressure pipe, a rotatable shaft having sets of eccentric cams mounted thereon, means controlled by one of said sets of cams to open the valve in one pipe and close the valve in the other pipe leading from the ends of said tube to reverse the connections with a reversal of flow, means controlled by another of said sets of cams to alternately operatively connect the meter with the proper integrating mechanism, means controlled by one of said cams to alternately record a change in the direction of flow and semi-circular cams half of a relatively large radius and a half of a relatively small radius mounted on said shaft with said eccentric cams, a motor to revolve said shaft, a vane in said conduit oscillatable with changes in the direction of flow, having a switch blade connected thereto, an electric circuit to actuate said motor having one terminal thereof connected to said semi-circular cams and the opposite terminal to said vane, contact points contacted by said switch blade on a reversal of flow, said contact points being connected to contacts adjacent said semi-circular cams to alternately contact the semi-circle of larger radius of said semi-circular cams to complete a circuit to cause the motor to turn said shaft a half revolution and to break the circuit when on a half revolution of said shaft the semi-circle of smaller radius comes adjacent thereto.

In testimony whereof I affix my signature.

FREDERICK N. CONNET.